United States Patent
Okusawa et al.

(10) Patent No.: US 7,091,625 B2
(45) Date of Patent: Aug. 15, 2006

(54) HOME-USE FUEL CELL SYSTEM

(75) Inventors: Tsutomu Okusawa, Hitachi (JP);
Osamu Yokomizo, Tokai (JP); Toshiki Kahara, Tokai (JP); Kouichi Chino, Hitachi (JP); Takaaki Mizukami, Hitachi (JP); Shin Takahashi, Hitachi (JP)

(73) Assignee: Hitachi, Ltd., Tokyo (JP)

( * ) Notice: Subject to any disclaimer, the term of this patent is extended or adjusted under 35 U.S.C. 154(b) by 120 days.

(21) Appl. No.: 10/819,159

(22) Filed: Apr. 7, 2004

(65) Prior Publication Data

US 2004/0212194 A1 Oct. 28, 2004

Related U.S. Application Data

(63) Continuation-in-part of application No. PCT/JP01/08940, filed on Oct. 11, 2001.

(51) Int. Cl.
*H02P 9/04* (2006.01)
*H02P 9/00* (2006.01)
*F03D 7/00* (2006.01)
*H02J 7/00* (2006.01)

(52) U.S. Cl. .................. 290/1 R; 290/44; 320/104; 320/116; 320/118; 320/136

(58) Field of Classification Search .............. 290/1 R, 290/44; 320/104, 116, 118, 136
See application file for complete search history.

(56) References Cited

U.S. PATENT DOCUMENTS

| | | | | |
|---|---|---|---|---|
| 4,197,169 A | * | 4/1980 | Zahn et al. | 205/343 |
| 4,277,317 A | * | 7/1981 | Grimes et al. | 205/343 |
| 5,006,846 A | * | 4/1991 | Granville et al. | 340/870.28 |
| 5,175,676 A | * | 12/1992 | Kikuchi | 363/58 |
| 5,181,026 A | * | 1/1993 | Granville | 340/870.28 |
| 5,661,349 A | * | 8/1997 | Luck | 307/151 |
| 5,726,553 A | * | 3/1998 | Waugh | 320/104 |
| 5,969,435 A | * | 10/1999 | Wilhelm | 307/64 |
| 6,175,217 B1 | * | 1/2001 | Da Ponte et al. | 322/19 |
| 6,215,272 B1 | * | 4/2001 | Ohara et al. | 320/104 |
| 6,229,279 B1 | * | 5/2001 | Dierker | 320/104 |
| 6,297,616 B1 | * | 10/2001 | Kubo et al. | 320/116 |
| 6,380,637 B1 | * | 4/2002 | Hsu et al. | 290/1 R |
| 6,392,387 B1 | * | 5/2002 | Sage et al. | 320/136 |
| 6,424,115 B1 | * | 7/2002 | Holl et al. | 320/104 |
| 6,430,066 B1 | * | 8/2002 | Emori et al. | 363/43 |
| 6,534,950 B1 | * | 3/2003 | LeBoe | 320/104 |

(Continued)

FOREIGN PATENT DOCUMENTS

JP A5-21077 1/1993
JP 5-36418 2/1993

*Primary Examiner*—Darren Schuberg
*Assistant Examiner*—Pedro J. Cuevas
(74) *Attorney, Agent, or Firm*—Mattingly, Stanger, Malur & Brundidge, P.C.

(57) ABSTRACT

During a time zone where a power demand is smaller than an average value of the entire power demands of homes, an excess portion obtained by subtracting a power demand from a base power portion supplied by PEFC (1) is charged in a capacitor (7) and a lead storage battery (8) in advance; and during a time zone where a power demand is larger than the average value, a peak power portion exceeding this average value is discharged from the capacitor (7) and the lead storage battery (8); thereby enabling the system to sufficiently meet daily home-use demand with requisite minimum equipment while effectively using surplus power. Thus, energy efficiency can be enhanced without wasting energy, and also cost efficiency can be improved.

4 Claims, 9 Drawing Sheets

U.S. PATENT DOCUMENTS

| | | | |
|---|---|---|---|
| 6,559,621 B1 * | 5/2003 | Corless et al. | 320/103 |
| 6,649,289 B1 * | 11/2003 | Hsu et al. | 429/13 |
| 6,680,600 B1 * | 1/2004 | Emori et al. | 320/126 |
| 6,700,349 B1 * | 3/2004 | Emori et al. | 320/104 |
| 6,747,438 B1 * | 6/2004 | Emori et al. | 320/126 |
| 6,762,587 B1 * | 7/2004 | Barbetta | 320/116 |
| 6,777,909 B1 * | 8/2004 | Aberle et al. | 320/104 |
| 6,777,912 B1 * | 8/2004 | Yamada et al. | 320/118 |
| 6,917,181 B1 * | 7/2005 | Emori et al. | 320/104 |
| 6,920,948 B1 * | 7/2005 | Sugiura et al. | 180/65.2 |
| 6,975,091 B1 * | 12/2005 | Lee et al. | 320/104 |
| 6,977,480 B1 * | 12/2005 | Emori et al. | 320/104 |
| 6,982,540 B1 * | 1/2006 | Richter et al. | 320/104 |
| 6,984,897 B1 * | 1/2006 | Skeist et al. | 290/44 |
| 6,989,651 B1 * | 1/2006 | Arikara et al. | 320/116 |

* cited by examiner

HOME-USE FUEL CELL SYSTEM

CROSS-REFERENCE TO RELATED APPLICATION

This is a continuation-in-part of PCT International Application Number PCT/JP01/08940 filed on Oct. 11, 2001, the content of which is incorporated herein by reference.

BACKGROUND OF THE INVENTION

1. Field of the Invention

The present invention relates to a compact power supply system using a fuel cell as a main power supply, and more specifically, relates to a home-use fuel cell system suitable for a home, which needs relatively large power during a short time period despite its small power demand on average.

BACKGROUND ART

2. Description of the Related Art

The fuel cell is a cell that uses, as a core matter, a combustible chemical matter such as hydrogen, carbon monoxide, hydrocarbons or the like, or a fuel comprising some of them, and that allows the chemical matter or fuel to electrochemically perform oxidation reaction, thereby directly converting the energy change in an oxidation process into electrical energy. The fuel cell, therefore, may promise for a high energy conversion rate.

In particular, as disclosed in, for example, JP, A 5-21077 and JP, A 5-36418, a solid polymer electrolyte type fuel cell is being developed as a fourth-generation fuel cell following a phosphoric acid type fuel cell, molten carbonate type fuel cell, and solid electrolyte type fuel cell. The solid polymer electrolyte type fuel cell is characterized by its output higher than those of fuel cell types developed earlier. Because of the higher output of this type of fuel cell plus its compactness, expectations are high for its commercialization. Now, its performance improvement is under a close study.

SUMMARY OF THE INVENTION

Originally, the development of fuel cells has been focused on ones for use in large scale power. As a result, the application of fuel cells to small scale power such as power for business-use or home-use has little been taken into consideration. For example, when a fuel cell is to be applied to home-use power, relatively large power demands (peaks) appear only in limited portions of time zones out of a day (e.g., the time zone before going to work and attending school in the morning, and the time zone after an evening meal), but, on average, power demand is relatively small.

Such being the case, if the power supply capacity of a fuel call is selected so as to cover power demands at the peak times to apply the fuel cell to home-use power supply, large surplus power will occur in much of the time zone except the peak times. Therefore, unless effective use of this surplus power can be made, a large energy loss would be incurred, thereby reducing energy efficiency and cost efficiency.

For example, in the case of a solid polymer electrolyte fuel cell (hereinafter referred to as "PEFC" as appropriate), even if surplus power increases, it is uneconomical because its power-selling price rate is low. Supposing the efficiency of PEFC is 30 to 40%, a loss portion corresponding to 60 to 70% of the output thereof is obtained only in the form of a low temperature exhaust gas that is difficult to use other than used for heating water because its temperature is on the order of 100° C. In this case, unless the consumption amount of the hot water is considerably large, the most thereof would be thrown away without being effectively utilized.

The object of this invention is to provide a home-use fuel cell system that allows energy efficiency and cost efficiency to be improved even when applied to power for home-use.

To achieve the above-described object, according to the present invention, there is provided a home-use fuel cell system for supplying power for power demands of a home, the home-use fuel cell system including a fuel cell for supplying a base power portion except a short-time peak power portion out of the power demands; and a power storage device for performing a discharge corresponding to the peak power portion.

With these features, if a base power portion supplied by a fuel cell is set to be nearly equal to the average value of power demands of homes, it is possible to cause the system to sufficiently meet daily home-use demand with requisite minimum equipment while effectively using surplus power, by charging an excess portion obtained by subtracting a power demand from a base power portion supplied by the fuel cell in a power storage device in advance during a time zone (such as a midnight zone) where power demand is smaller than the average value, and by discharging the peak power portion exceeding this average value from the power storage device during a time zone (such as a morning or evening) where power demand is larger than the average value. Thus, energy efficiency can be enhanced without wasting energy, as well as cost efficiency can be improved. Also, as described above, covering the base power portion corresponding to the average power demand by the output of a fuel cell, which is relatively expensive, and covering the peak power portion that cannot be covered by the fuel cell, by a power storage device having, e.g., a lead storage battery and the like, which are relatively inexpensive, allows the system to be optimized in terms of cost allocation to attain cost reduction. This also contributes to the improvement in cost efficiency.

Also, to achieve the above-described object, according to the present invention, there is provided a home-use fuel cell system for supplying power for power demands of a home, the home-use fuel cell system including a fuel cell for supplying a base power portion except a short-time peak power portion out of the power demands; and a power storage device having a capacitor and a secondary battery, for performing a discharge corresponding to the peak power portion.

As a power storage device, a capacitor, which is high in response speed but relatively small in capacity, e.g., an electric double layer capacitor; and a secondary battery, which in low in response speed but is relatively large in capacity, as well as inexpensive, e.g., a lead storage battery, are used in combination to mutually compensate for respective weak points, thereby enabling the power storage device to cope with widely-varying power demands.

Furthermore, to achieve the above-described object, according to the present invention, there is provided a home-use fuel cell system for supplying power for power demands of a home, the home-use fuel cell system including a fuel cell for supplying a base power portion except a short-time peak power portion out of the power demands; and a power storage device for performing a discharge corresponding to the peak power portion. This fuel cell system is configured so that, when the output of the fuel cell is represented by $P$ [W], the capacity of the power storage device is represented by $Q$ [Wh], and the discharge depth of the power storage device is represented by x [%], the following relationships are satisfied: $250 \leq P \leq 1000$, and $1000/x \times 10 \leq Q \leq 2600/x \times 10$.

With this feature, it is possible to construct an economical home-use system that is most inexpensive, while preventing lifetime reduction by keeping the discharge depth of the power storage device at 10% or less.

It is preferable that the above-described home-use fuel cell system be configured to satisfy the following relationships: $(0.0085P^2-7.2P+4600)/x \times 10 \leq Q \leq (0.0085 \times P^2-7.2P+7080)/x \times 10$.

Moreover, to achieve the above-described object, according to the present invention, there is provided a home-use fuel cell system for supplying power for power demands of a home, the home-use fuel cell system including a fuel cell for supplying a base power portion except a short-time peak power portion out of the power demands; a power storage device having at least a secondary battery for performing a discharge corresponding to the peak power portion; and a protection mechanism for protecting the secondary battery so that the discharge depth thereof does not exceed a predetermined value.

The lifetime of a secondary battery is generally determined by the discharge depth, and therefore, if the secondary battery performs a charge and discharge following variations of power demands, just as they are, the lifetime thereof may decrease and the reliability thereof may become difficult to secure. With such being the situation, in the present invention, there is provided a protection mechanism for protecting the secondary battery so that the discharge depth thereof does not exceed the predetermined value, whereby the secondary battery is allowed to secure the lifetime thereof and to have an enhanced reliability.

In the above-described home-use fuel cell system, it is preferable that the protection mechanism have interrupting means for interrupting a charging operation or discharging operation of the secondary battery in accordance with a voltage of the secondary battery.

It is also preferable that the above-described home-use fuel cell system have a natural force power-generating mechanism as an auxiliary power supply.

DESCRIPTION OF THE PREFERRED EMBODIMENTS

Figure 1:
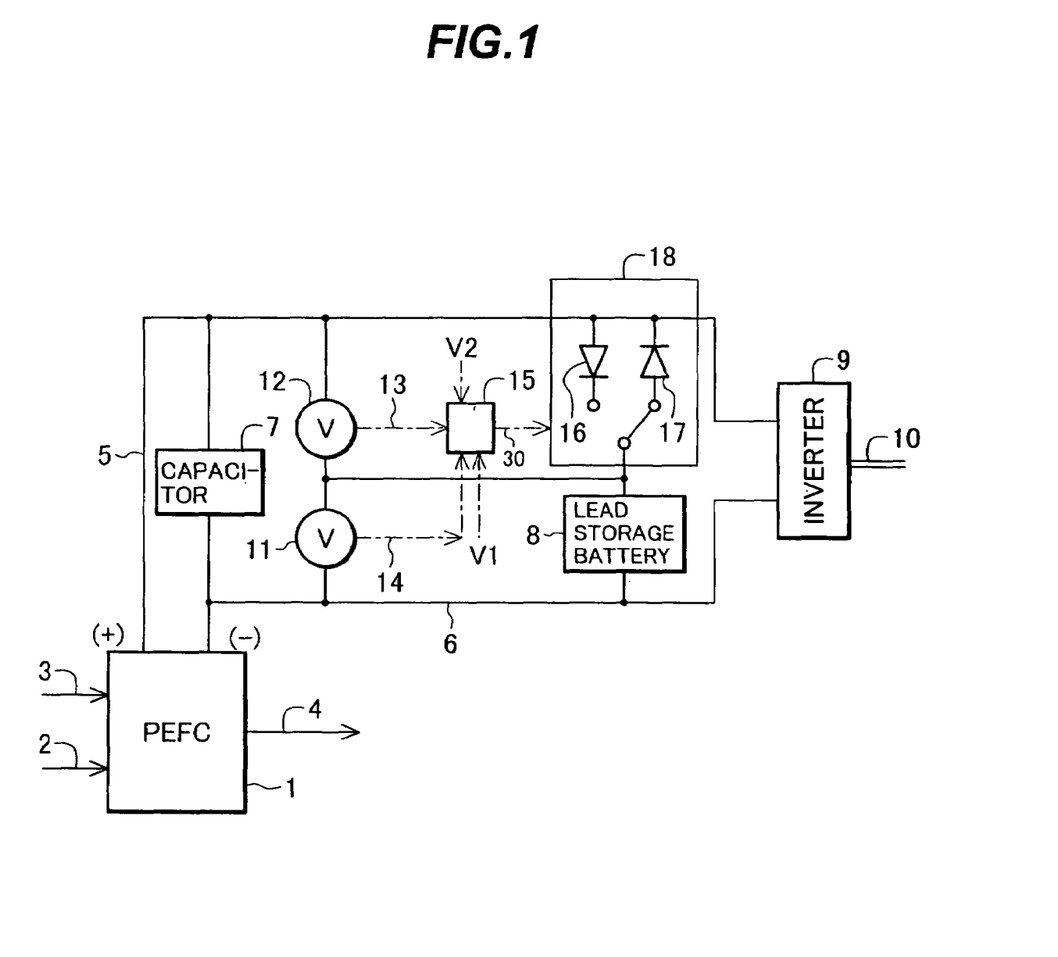
FIG. 1 is a schematic diagram showing the outline of the construction of an entire home-use fuel cell system according to an embodiment of the present invention.

Hereinafter, an embodiment according to the present invention will be described with reference to the drawings. FIG. 1 is a schematic diagram showing the outline of the construction of an entire home-use fuel cell system (power supply system using a fuel cell) according to this embodiment of the present invention.

In FIG. 1, the power supply system using a fuel cell comprises a fuel cell that generates direct current power by a reformed fuel containing much hydrogen portion (hereinafter referred to as "hydrogen rich gas") 3 and air 2, and that is preferably a solid polymer electrolyte fuel cell (hereinafter referred to as a "PEFC" as appropriate) 1; a capacitor that is connected in parallel with a cathode 5 and anode 6 of the PEFC 1, that charges therein a portion of the output of the PEFC 1 when a power demand is smaller than the output of the PEFC 1, that discharges it when the power demand is larger than the output of the PEFC 1, and that is preferably electric double layer capacitor 7; a secondary battery, such as a lithium ion battery, that is connected in parallel with the cathode 5 and anode 6 of the PEFC 1, that charges therein a portion of the output of the PEFC 1 when a power demand is smaller than the output of the PEFC 1, that discharges it when the power demand is larger than the output of the PEFC 1, and that is preferably a lead storage battery 8 because of its low going price; a changeover device 18 that is connected in series with the lead storage battery, and that switches a circuit at times of charging and discharging of the lead storage battery 8; a voltmeter 11 for measuring a voltage of the lead storage battery 8 to prevent the voltage of the lead storage battery 8 from decreasing to a cutoff voltage (described later) or less; a voltmeter 12 for measuring a voltage of the lead storage battery 8 to prevent the voltage of the lead storage battery 8 from becoming an overvoltage (described later); an arithmetic and control unit 15 that, upon receipt of voltage signals 13 and 14 from the voltmeters 11 and 12, performs a computation based on the cutoff voltage value V1 and overvoltage value V2, and that sends a control signal 30 to the changeover device 18; and an inverter 9 for converting power generated by the PEFC 1 from a direct current to an alternating current 10.

The inverter 9 converts the output of the electric double layer capacitor 7 and lead storage battery 8, or the power discharged thereby from a direct current into an alternating current, and supplies it to a load comprising alternating current electric equipment (not shown).

The PEFC 1 generates direct current power and exhaust gas 4 at about 100° C. by allowing hydrogen rich gas 3 and air 2 to electrochemically react with each other within the PEFC 1. Regarding the value of outputted power, the PEFC 1 supplies a base power except peak power described later, out of the entire power required by the load side via the inverter 9, (namely, home-use power demands in interest). When recovering water from exhaust gas at about 100° C., because the water is nearly pure water, a portion of the water may be used as water for vapor in a reformer or supply water for the lead storage battery. The direct current power generated by the PEFC 1 is adapted to be supplied to the electric double layer capacitor 7, lead storage battery 8, and inverter 9, each of which is connected in parallel with the cathode and anodes of the PEFC 1.

Although not shown in FIG. 1, if there is equipment to be directly used with a direct current, it will be able to receive power by connecting it in parallel with this circuitry and adjusting the voltage of the equipment to a required voltage (for example, in the case of equipment having a communication/control circuit including a semiconductor device, such as a transistor, used at a voltage of about 10 V or less).

The electric double layer capacitor 7 and lead storage battery 8 constitute together a power storage device. The electric double layer capacitor 7 speedily charges the PEFC 1 with surplus power to store power therein, and in correspondence with short-time peak power required by the load side via the inverter 9, the electric double layer capacitor 7 performs a high speed discharge to meet the power demand, thereby performing the function of setting the base power of the PEFC 1 to a low level. On the other hand, the lead storage battery 8 has a response speed lower than that of the electric double layer capacitor 7, but the more, it charges and stores therein surplus power of the PEFC 1, and performs a discharge corresponding to short-time peak power required by the load side via the inverter 9, thereby performing the function of setting the base power of the PEFC 1 to a low level.

The outputs and capacities of the PEFC 1, electric double layer capacitor 7 and lead storage battery 8 can be obtained as follows. Let the output of the PEFC 1 be P [W], the total capacity of the electric double layer capacitor 7 and lead storage battery 8 be Q [Wh], and the total discharge depth of the electric double layer capacitor 7 and lead storage battery 8 be x [%]. Then, in the following range of the power p (W) of the PEFC 1:

$$250 \leq P \leq 1000$$

Q can be expressed using the following equation by applying a linear approximation to the economical upper limit and lower limit of the capacity Q.

$$1000/x \times 10 \leq Q \leq 2600/x \times 10$$

Also, by making an approximation using quadratic equations, the capacity Q can be expressed by following equation.

$$(0.0085P^2 - 7.2P + 4600)/x \times 10 < Q < (0.0085 \times P^2 - 7.2P + 7080)/x \times 10$$

The above equation will be explained later.

The purpose of providing the power storage device with the lead storage battery 8 and electric double layer capacitor 7 as described above, is to economically meet the peak loads by taking advantage of the difference in characteristic between the lead storage battery 8 and electric double layer capacitor 7. Specifically, the lead storage battery 8 can secure a discharge capacity at a low cost but has not a so high discharge speed, whereas the electric double layer capacitor 7 has a high discharge speed but cannot secure a so much discharge capacity. Accordingly, the lead storage battery 8 and the electric double layer capacitor 7 are combined to mutually compensate for respective weak points, thereby allowing the power storage device to meet widely-varying power demands.

The voltmeters 11 and 12, arithmetic and control unit 15, and changeover device 18 constitute together the protection mechanism for the lead storage battery. The functions thereof will be described in detail below. In general, the lifetime of a storage battery (secondary battery) except a capacitor is determined by the discharge depth, overcharged voltage, and discharge current. Therefore, if the storage battery performs a charge and discharge following variations of power demands via the inverter 9, just as they are, a reliable power supply system cannot be provided. Such being the case, in this embodiment, there are provided voltmeters 11 and 12, an arithmetic and control unit 15, and a changeover device 18. When the lead storage battery 8 performs a discharge and the voltage thereof becomes the cutoff voltage V1, which is a lower limit voltage, the arithmetic and control unit 15 issues a signal 30, upon receipt of a signal from the voltmeter 11, to switch the changeover device 18 to the circuit of a diode 16 (in other words, the changeover device 18, serving as interrupting means, interrupts the discharging operation of the lead storage battery 8), to bring the lead storage battery 8 into the charging mode. At a point in time when the charge voltage becomes a predetermined voltage, the arithmetic and control unit 15 switches back the changeover device 18 to the circuit of a diode 17, which is in a discharge mode. On the other hand, when the sum of measured voltages of the voltmeter 11 and voltmeter 12 exceeds the value of overvoltage charge, the changeover device 18 is switched to the circuit of a diode 17, which is in a discharge mode, (in other words, the changeover device 18, serving as interrupting means, interrupts the charging operation of the lead storage battery 8, thereby protecting the system. This makes it possible to secure the lifetime of the lead storage battery 8, serving as a secondary battery, and to enhance the reliability thereof. While the changeover device 18 comprises a diode 16 or charging, and a diode 17 for discharging, the changeover device 18 may be one using a semiconductor such as a transistor.

Next, operations in this embodiment that are configured as described above will be explained below in a sequential manner.

Figure 2:
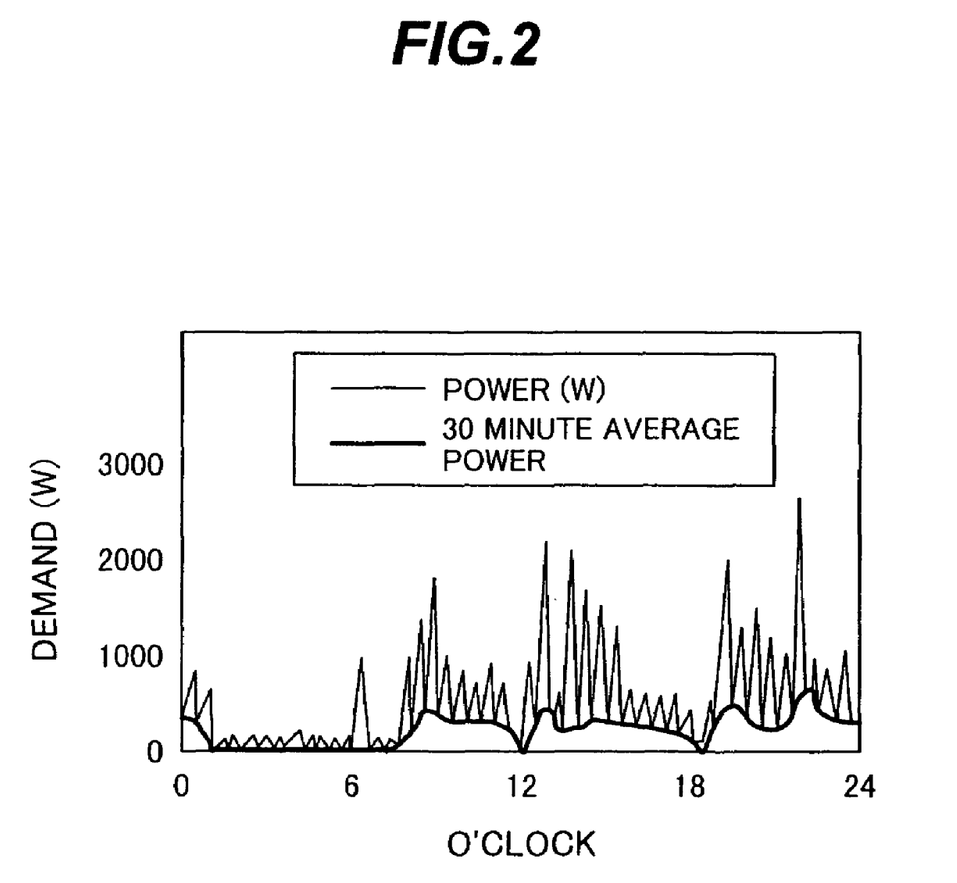
FIG. 2 is a diagram showing typical daily power consumption behavior in a common home.

(1) Enhancement of Energy Efficiency and Cost Efficiency by Load Sharing Between Base Power and Peak Power Reference is first made to the demand behavior of home-use power, which constitutes the main subject of the present invention. Nowadays almost all homes purchase power from a grid power. FIG. 2 shows typical daily power consumption behavior of a common home. The lateral axis represents o'clock and covers from 0 o'clock in the morning to 12 o'clock in the afternoon, and the longitudinal axis represents the power demand.

In FIG. 2, the thin line indicates variations of the power demand with time, and the thick solid line indicates average power values for each 30 minute. As illustrated in FIG. 2, after the midnight zone from about 1:00 to about 6:00, during which only a refrigerator or the like is working and little power demand occurs, a very short-time sizable power demand (peak value: a little over 1000 W) occurs during the time zone between 6 o'clock and about 7 o'clock before going to work or attending school, due to breakfast after rising, and the like. From the time between 8 o'clock and 10 o'clock toward before noon, there occurs a very short-time sizable power demand in the morning (peak value: a little under 2000 W; average power: about 500 W) that will be attributable to the use of household electrical equipment such as a vacuum cleaner, washing machine, drying machine, iron, or the like.

In the afternoon, there again occurs relatively long-time large power demand (average power: about 200 to about 500 W) that will be attributable to the use of household electrical equipment as in the above-described case, or to the use of an air conditioner in summer due to temperature rise. In particular, between 13 o'clock and 15 o'clock, peak values amounting to a little under 2000 W at maximum occurs plurality of times.

Thereafter, during the time zone before and after 18 o'clock, during which an evening meal is prepared, both the average value and peak value decrease, but in the evening meal time zone between 19 o'clock and 21 o'clock, power consumption rapidly increases with coming home of the family. During the time period from happy time at home thereafter up to about 1 o'clock before getting to bed, a long-time maximum power demand (average power: about 500 to 800 W) occurs. In particular, around 22 o'clock, a peak value amounting to nearly 2800 W at maximum occurs that will be attributable to the use of a hair drier after bathing.

Here, we focus attention only on varying power out of the power demands of a home exhibiting the above-described behavior. In view of the fact that the maximum power demand is as high as 2800 W, if it is attempted to meet all this power demands by the power generation of a PEFC, a PEFC having an output on the order of 3000 W must be provided making allowance for such variations. However, the maximum value of 30 minute average power of a home is lower than 1000 W as described above, and an average power value per day is 200 to 400 W. As a result, as described above, when attempting to cover all power demands by the PEFC, surplus power close to at least 80% occurs, and a large amount of surplus exhaust heat with a relatively low temperature of about 100° C. occurs in association with power generation, since the efficiency of the PEFC is generally 30 to 40%. Therefore, when these surplus power and surplus exhaust heat cannot be effectively used (for example, the surplus exhaust heat at 100° C. is of limited application because of its low temperature, and difficult to use other than used for heating water), a large energy loss is caused, thereby reducing energy efficiency and cost efficiency. Also, the price of a PEFC is currently estimated to be about three million yens/kW, and hence, if power on the order of 3000 W is outputted as described above, it costs about nine million yens. This makes PEFC very expensive, resulting in reduced economic efficiency.

With such being the situation, in this embodiment, as described above, there are provided the PEFC 1 for supplying a base power portion except short-time peak power portion out of power demands of a home, and the power storage device (capacitor 7 and lead storage battery 8) for performing a discharging operation corresponding to the peak power portion. With these arrangements, if a base power portion supplied by the PEFC 1 is set to be nearly equal to the average value of power demands of homes (for example, about 200 to about 400 W according to the above-described example), it is possible to cause the system to sufficiently meet a daily home-use demand with requisite minimum equipment while effectively using surplus power, by charging an excess portion obtained by subtracting a power demand from a base power portion supplied by the PEFC 1 in the capacitor 7 and lead storage battery 8 in advance during a time zone (such as a midnight zone) where a power demand is smaller than the average value thereof; and by discharging the peak power portions exceeding the average value from the capacitor 7 and lead storage battery 8 during a time zone (such as morning or evening) where a power demand is larger than the average value.

Thus, energy efficiency can be enhanced without wasting energy, as well as cost efficiency can be improved. Also, as described above, covering the base power portion corresponding to the average power demand by the output of the PEFC 1, which is relatively expensive, and covering the peak power portion that cannot be covered by the PEFC 1, by the power storage device having the lead storage battery 8 and the like, which are relatively inexpensive, allows the system to be optimized in terms of cost allocation to achieve cost reduction. This also contributes to the improvement in cost efficiency.

(2) Optimization of Output of Fuel Cell and Capacity of Power Storage Device

As described above, since a fuel cell such as the PEFC 1 is relatively expensive, one having an output as small as possible is desirable as long as it can cover the home-use demand. In this case, it is necessary to increase the capacity of the power storage device (electric double layer capacitor 7+lead storage battery 8) in correspondence with the reduction of output.

Figure 3:
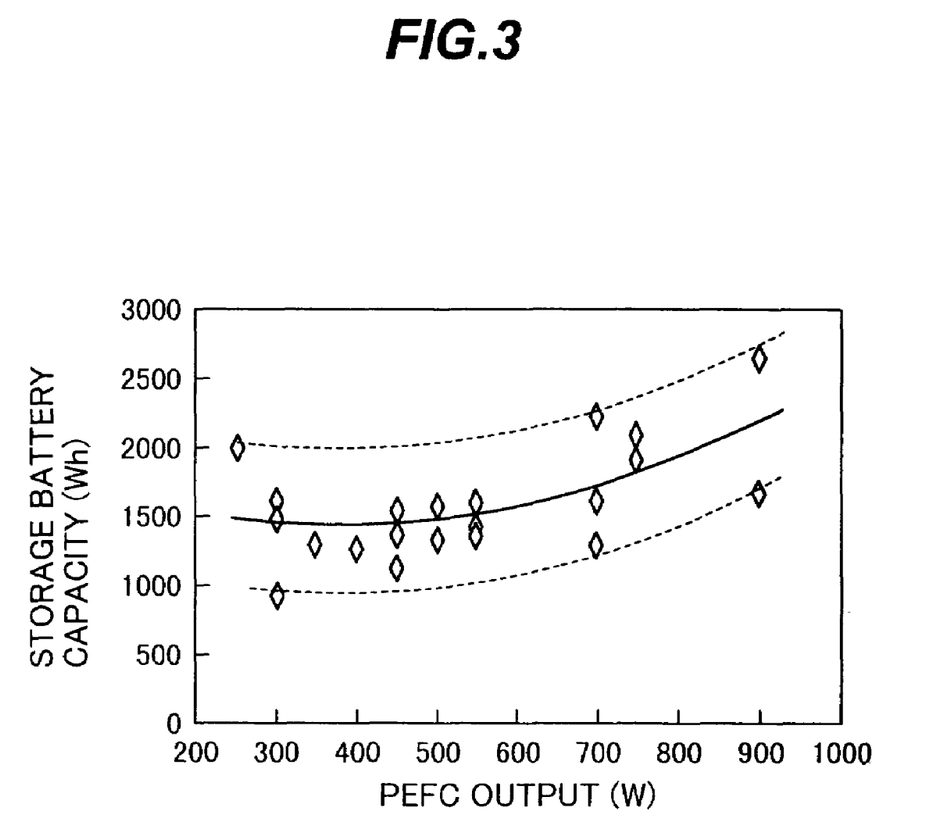
FIG. 3 is a diagram showing analytical results based on collected data about actual consumption power entity of homes.

From this point of view, the inventors of this application performed an analysis based on collected data about actual consumption power entity of homes, in order to search for the combination of outputs of fuel cell and capacities of power storage device, the combination being considered to be most suitable for home-use when imagining a power supply system having a fuel cell (PEFC) and a power storage device such as a secondary battery. FIG. 3 is a diagram showing the analytical results.

In the analysis, first, actual power variation data of a large number of typical homes was collected family by family, on a day-by-day basis for a total of 7 to 14 days over three seasons: summer, autumn, and winter.

Taking into consideration daily average power of 250 to 400 [W] in a home in the example illustrated with reference to FIG. 2, and the actual maximum power of 2.8 to 3 kW in a home, the average power value among homes is evaluated as $[\sqrt{(250+400) \cdot (2800+3000)}]/2=970$ kW, and therefore, P=250 to 1000 [W] was deemed to be appropriate as an output of the PEFC. For example, regarding a day in a family, PEFC output values in the above-described range are set to 250, 300, 350, 400, 450, 500, 550, 650, 700, 750, 800, 850, 900, 950, and 1000 [W], and the capacities $Q_p$ [Wh] of the power storage device that are necessary for daily power in home when powers P of the PEFC are set as described above, were determined with respect to the respective PEFC output values, under the condition that the discharge depth of the power storage device x=30%; and the utilization rate of the grid power is 10% or less. As a result, regarding actual power demand varying data on a day in the family, a plurality of sets of combination (P, $Q_p$) of outputs P of the PEFC and capacities $Q_p$ of the power storage device are obtained as follows: (250, $Q_{250}$), (300, $Q_{300}$) (350, $Q_{350}$) (400, $Q_{400}$), (450, $Q_{450}$), (500, $Q_{500}$), (550, $Q_{550}$), (600, $Q_{600}$), (650, $Q_{650}$), (700, $Q_{700}$), (750, $Q_{750}$), (800, $Q_{800}$), (850, $Q_{850}$) (900, $Q_{900}$), (950, $Q_{950}$), and (1000, $Q_{1000}$). Regarding each of the above-described sets, letting the cost of the PEFC system be X (yens/W) and letting the cost of the power storage device be Y (yens/Wh), the cost of the system with the power storage device becomes $PX+Q_pY$. From among the costs of these plurality of sets of combination, the cost exhibiting a minimum value, i.e., $(PX+Q_pY)$min is selected. However, the sets of not less than a predetermined cost are omitted. Here, let the set of combination at this time be (Pmin(1), $Q_p$min(1)). Then, if this processing is performed over ten days, ten sets of (Pmin(n), $Q_p$min(n)) are obtained with n=1 to 10. From among these sets, the maximum value of Pmin and that of $Q_p$min are independently selected, and referred to as Pminmax and $Q_p$minmax, respectively. In this manner, an optimum combination of power of the PEFC and capacity of the power storage device in a family for about two weeks in a season were determined. This processing was similarly performed in winter, intermediate seasons (spring and autumn), and summer on a season-by-season basis. In the same manner, optimum combinations in winter, intermediate seasons (spring and autumn), and summer were obtained regarding ten-plus families. FIG. 3 shows the obtained results.

In FIG. 3, the lateral axis represents the output [W] of a unit PEFC, and the longitudinal axis represents the capacity [Wh] of a power storage device. It can be seen from FIG. 3 that, in order to realize an optimum combination from the aspects of both low cost and energy efficiency, the output P [W] of the PEFC and the capacity Q [Wh] of the power storage device must be combined so as to be in the range defined by the following equations:

$$250 \leq P \leq 1000; \text{ and } 1000 \leq Q \leq 2600$$

wherein the above-described capacity of a power storage device includes the capacity of a capacitor, as a matter of course.

In the case of a high-performance storage battery of which the lifetime does not deteriorate even at a discharge depth of, e.g., 60%, an optimization can be achieved by multiplying the above-described battery capacity by 30/60. From this point of view, when the above equations are generalized with the tolerable discharge depth of a power storage device represented by x [%], the following equations can be obtained using a linear approximation. Here, the reason why points over the upper limit are few is that the Q values in which costs exceeds a predetermined value are omitted in this graph, as described above. On the other hand, the reason why points under the lower limit are few is that, if the Q value comes down below the lower limit, the rate of power purchasing from the grid power supply becomes 10% or more, with the result that the cost advantage of the PEFC itself over the grid power supply is lost.

$$250 \leq P \leq 1000; \text{ and}$$

$$1000/x \times 10 \leq Q \leq 2600/x \times 10 \quad \text{(Equation 1)}$$

Furthermore, the inventers of this application performed a regression analysis on many data shown in FIG. 2, and thereby the relationships expressed by the equations below could be obtained, as an approximate expression (represented by the quadratic curve shown by the solid line in FIG. 3) and a standard deviation σ of data from this approximate expression. In the above linear approximation equation (1), since the upper and lower limits are constant even if the fuel cell power P increases, the choice of the charge amount of the power storage device shifts toward the lower cost advantage. Accordingly, in order to make a selection such as to achieve high cost efficiency, i.e., high energy efficiency, it is desirable to make a selection using the following equations:

$$Q = (0.0085P^2 - 7.2P + 5840)/x \times 10$$

$$\sigma = 1240/x[\%] \times 10$$

With these equations rewritten, the storage battery capacity [Wh] is within the following range (the upper and lower limits are represented by the quadratic curves shown using the dotted lines in FIG. 3).

$$(0.0085P^2 - 7.2P + 4600)/x \times 10 \leq Q \leq (0.0085 \times P^2 - 7.2P + 7080)/x \times 10 \quad \text{(Equation 2)}$$

In the present embodiment, as described above, the aforesaid both equations (1) and (2) are satisfied. This makes it possible to construct a reasonable and economical home-use system that is most inexpensive, while preventing lifetime reduction by keeping the discharge depth of the power storage device 7 and 8 at 10% or less.

As described in the above items (1) and (2), according to this embodiment, it is possible to sufficiently meet daily home-use demand with requisite minimum equipment while effectively using surplus power during a time zone where a power demand is smaller, and thereby energy efficiency can be enhanced without wasting energy, as well as cost efficiency can be improved.

From the viewpoint of the cost allocation with respect to the PEFC 1, which is relatively expensive, and the power storage device 7 and 8, which are relatively inexpensive, respective output value and power storage capacity are set so as to achieve optimum load sharing. Here, in particular, a protection mechanism 8 for the lead storage battery 8 is provided to improve the lifetime thereof, and thereby the output magnitude of the PEFC 1, which is relatively expensive, is reliably reduced, whereby the power price rate can be reliably reduced. These more reliably enhances the cost efficiency.

The present invention is not limited to the above-described embodiment. Various modifications can be made without departing the true spirit and inventive concept of the present invention. Such modifications will be successively described below.

(A) Case Where Grid Power Supply is Used Instead of Capacitor

Figure 4:
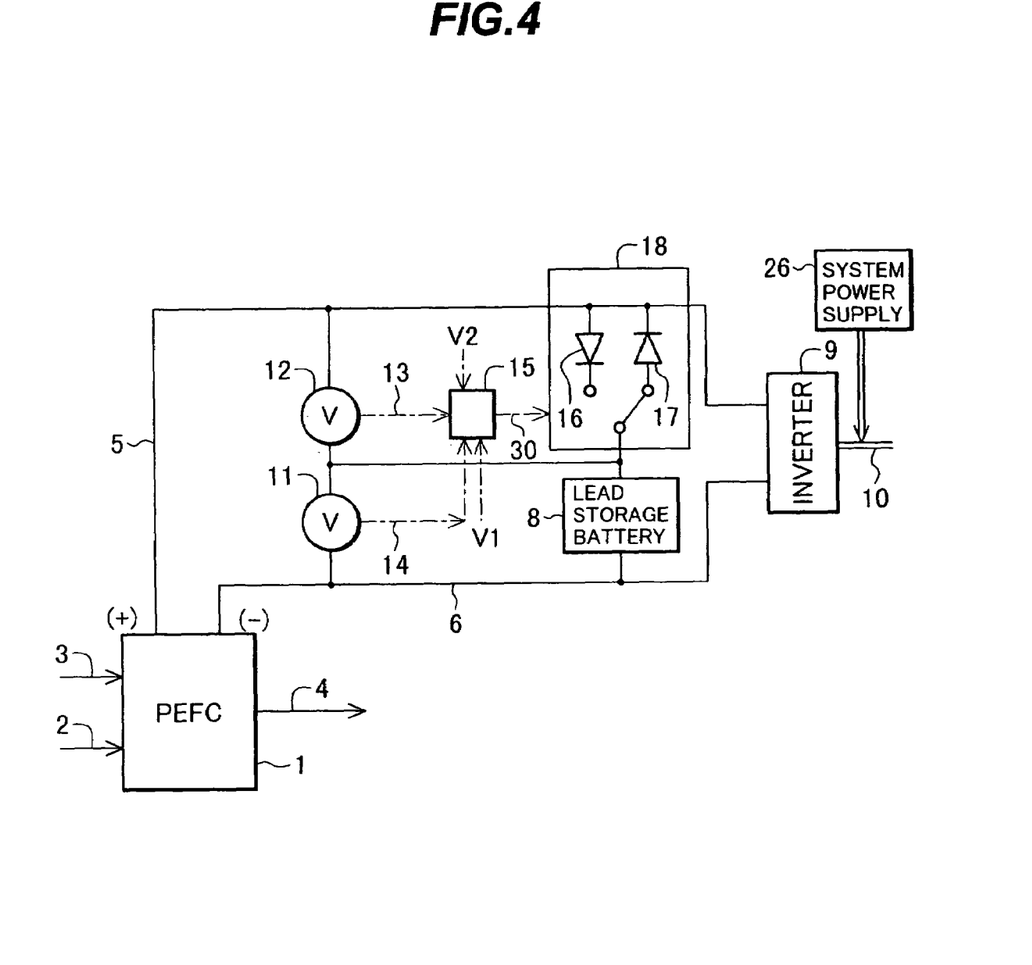
FIG. 4 is a schematic diagram showing the outline of the construction of an entire power supply system using a fuel cell according to a modification in which a grid power supply is used instead of a capacitor.

FIG. 4 is a schematic diagram showing the outline of the construction of an entire power supply system using a fuel cell according to a modification. In this modification, the electric double layer capacitor 7 in the embodiment shown in FIG. 1 is omitted, and a grid power supply 26 is connected to the load side via an inverter 9.

In the above-described embodiment, the lead storage battery 8 is protected by the protection function (of stopping a discharge in accordance with a voltage or current value) of the voltmeters 11 and 12, serving as a protecting mechanism for the lead storage mechanism 8, arithmetic and control unit 15, and changeover device 18 so that the discharge depth of the lead storage battery does not exceed a specified value, and the shortfall (for example, about 10% of power demand) is compensated for by a discharge by the capacitor 7. However, in this modification, the shortfall is compensated for by the grid power supply 26.

This modification has the following significance. For example, when the output magnitude of the PEFC 1 is small and the price of the grid power supply 26 is low, it is more economical to entrust the grid power supply 26 with high-speed discharge responses, which is the role of the electric double layer capacitor 7 in the embodiment shown in FIG. 1. In other words, this modification provides an economical construction in the case where a power system using a compact fuel cell is provided.

(B) Case Where Capacitor is Connected in Parallel with Lead Storage Battery

Figure 5:
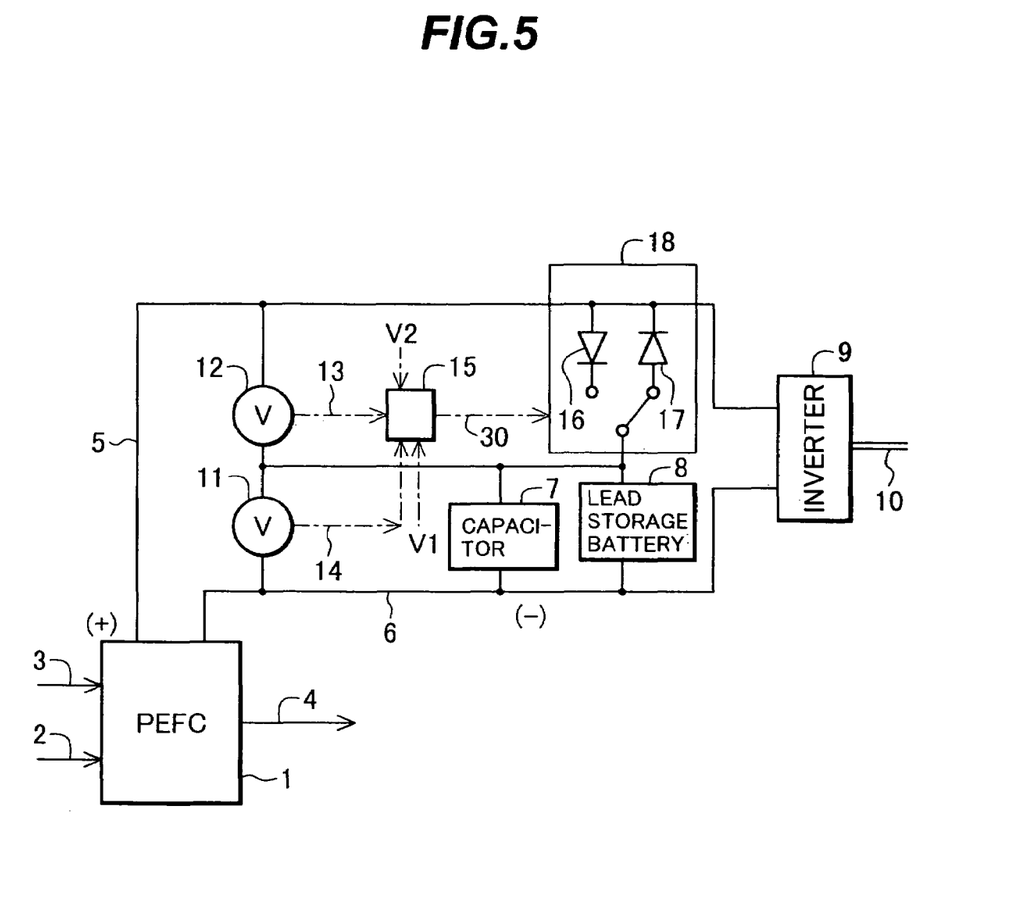
FIG. 5 is a schematic diagram showing the outline of the construction of an entire power supply system using a fuel cell according to a modification in which a capacitor is connected in parallel with a lead storage battery.

FIG. 5 is a schematic diagram showing the outline of the construction of an entire power supply system using a fuel cell according to this modification. In this modification, with the position of an electric double layer capacitor 7 changed with respect to the embodiment shown in FIG. 1, the electric double layer capacitor 7 is connected in parallel with the lead storage battery 8.

According to this modification, when performing a charge or discharge, the lead storage battery can be protected from damage during an instantaneous transient period, and therefore, a high-reliability power supply system using a fuel cell can be provided.

Figure 6:
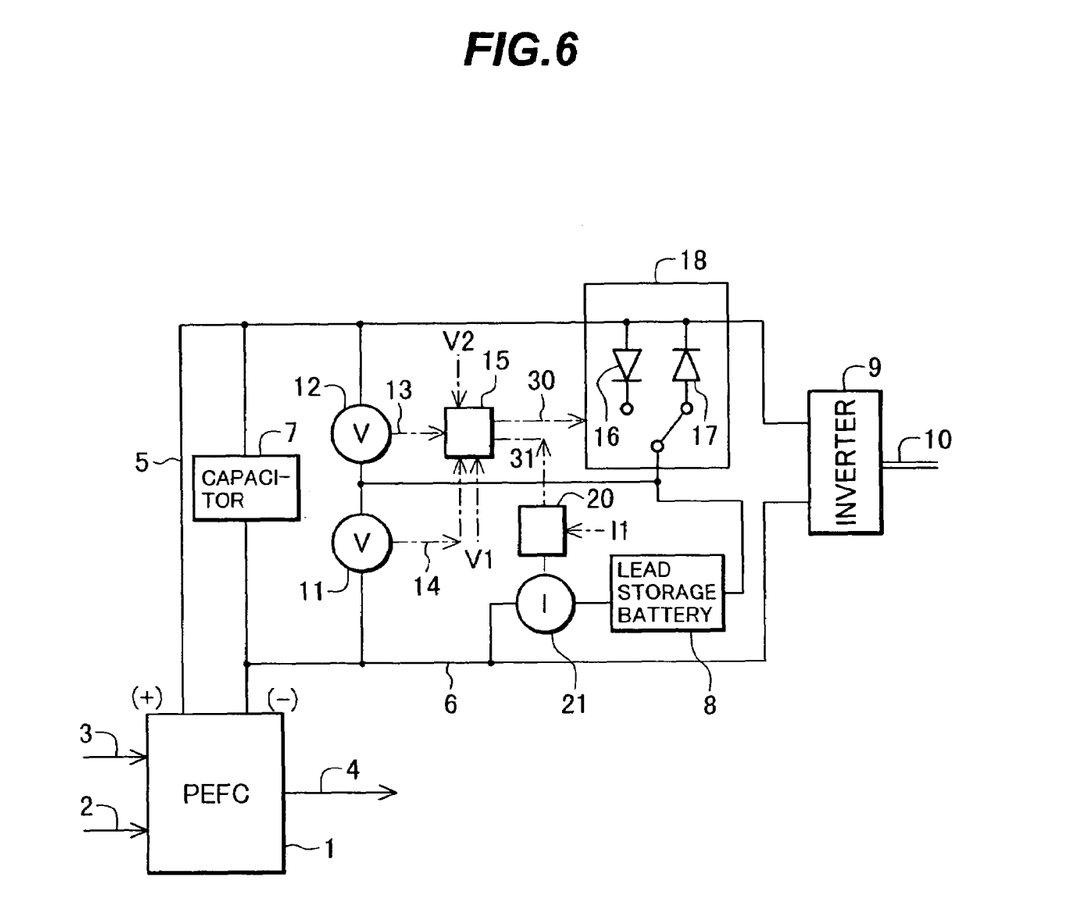
FIG. 6 is a schematic diagram showing the outline of the construction of an entire power supply system using a fuel cell according to a modification in which an ammeter for measuring a discharge current of the lead storage battery is provided.

(C) Case Where Ammeter for Measuring Discharge Current of Lead Storage Battery is Provided FIG. 6 is a schematic diagram showing the outline of the construction of an entire power supply system using a fuel cell according to this modification. This modification is arranged so that, in the construction of the embodiment shown in FIG. 1, an ammeter 21 is inserted in series with the lead storage batter 8 to measure a discharge current of the lead storage batter 8, and so that, when the discharge current exceeds a specified value 11, a control signal 31 is sent from a comparator 20 to the arithmetic and control unit 15 for switching the changeover device 18 to the charging mode. This control has precedence over control signals 13 and 14 from the voltmeters. Here, the comparator 20 may be incorporated into the arithmetic and control unit 15 of the system. In this case, the ammeter 21 and comparator 20 in addition to the voltmeters 11 and 12, arithmetic and control unit 15, and changeover device 18 constitute together the protection mechanism for the lead storage battery.

According to this modification, since the lead storage battery 8 can be protected against an overcurrent during discharge, a higher-reliability power supply system using a fuel cell can be provided.

(D) Case Where Charger for Charge Acceleration is Provided

Figure 7:
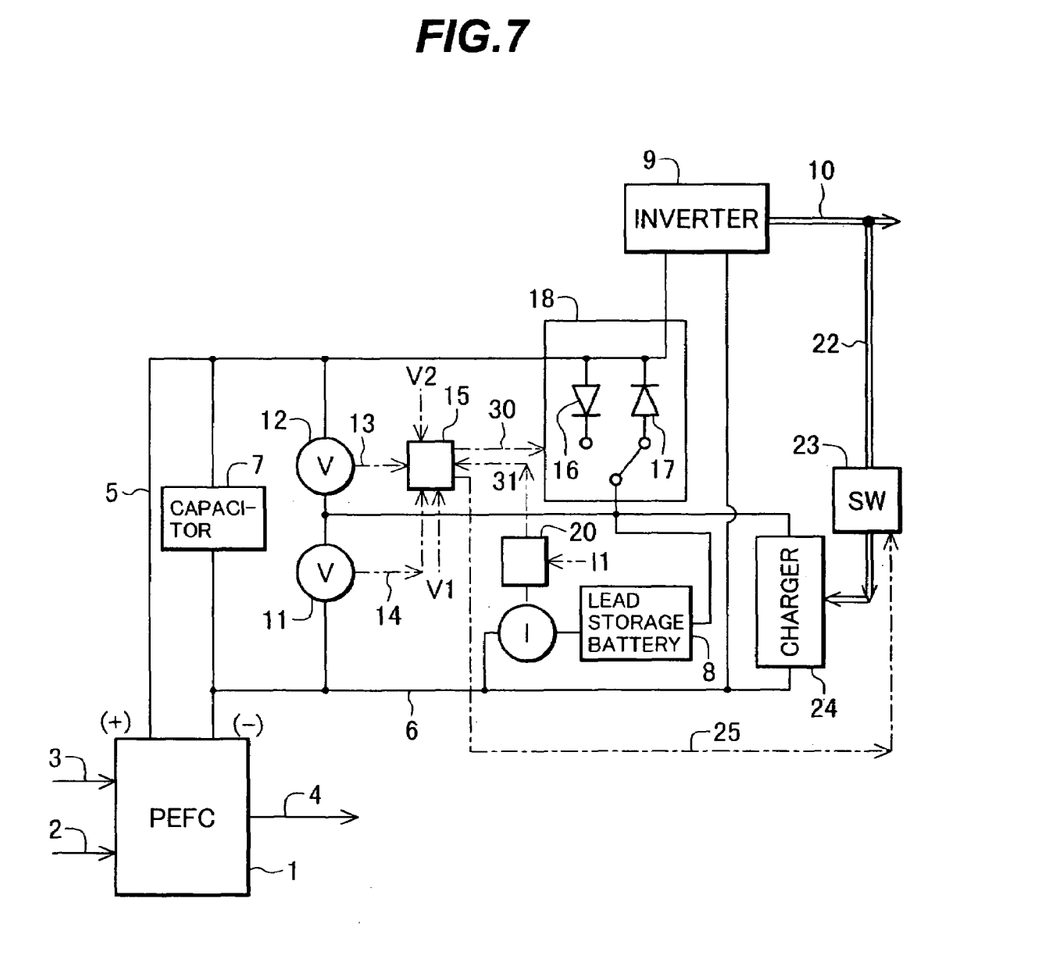
FIG. 7 is a schematic diagram showing the outline of the construction of an entire power supply system using a fuel cell according to a modification in which a charger for accelerating charge of the lead storage battery is provided.

FIG. 7 is a schematic diagram showing the outline of the construction of an entire power supply system using a fuel cell according to this modification. This modification is arranged so that, in the construction of the above-described modification (C) shown in FIG. 6, there are further provided a charger 24 connected in parallel with the lead storage battery 8, for converting an alternating current to a direct current or quasi-direct current to charge the lead storage battery 8, a switch 23 for performing control operations regarding energization and interruption with respect to the charger 24, based on a control signal 25 from the arithmetic and control device 15, and a circuit 22 for introducing a portion of the output (alternating current) of the inverter 9 into the above-described switch 23.

Once a signal 30 for bringing the lead storage battery 8 into the charging mode has been sent from the arithmetic and control device 15 to the changeover device 18, the signal 25 is sent to the switch 23; the switch 23 is turned on; and an alternating current power is sent to the charger 24; thereby starting up a charge operation. When the lead storage battery 8 enters the discharging mode after the charge has been finished, the switch 23 is turned off.

The following is the reason why this modification is configured as described above. When the lead storage battery 8 is connected in parallel with the direct current circuit of the PEFC 1, charging the storage battery 8 takes more time than discharging it, because the difference between the discharge voltage and charge voltage is small. Such being the case, in order to make the charge time at least equal to or shorter than the discharge time, the voltage of the lead storage battery 8 is set, using the charger 24, so as to become higher than that of the PEFC 1, but not to become an overcharge voltage, thereby achieving the enhancement of charging speed.

According to this modification, it is possible to provide a fuel-cell power supply system having high power storage efficiency and high reliability.

(E) Case Where Grid Power Supply is Used as Power Source for Charger

Figure 8:
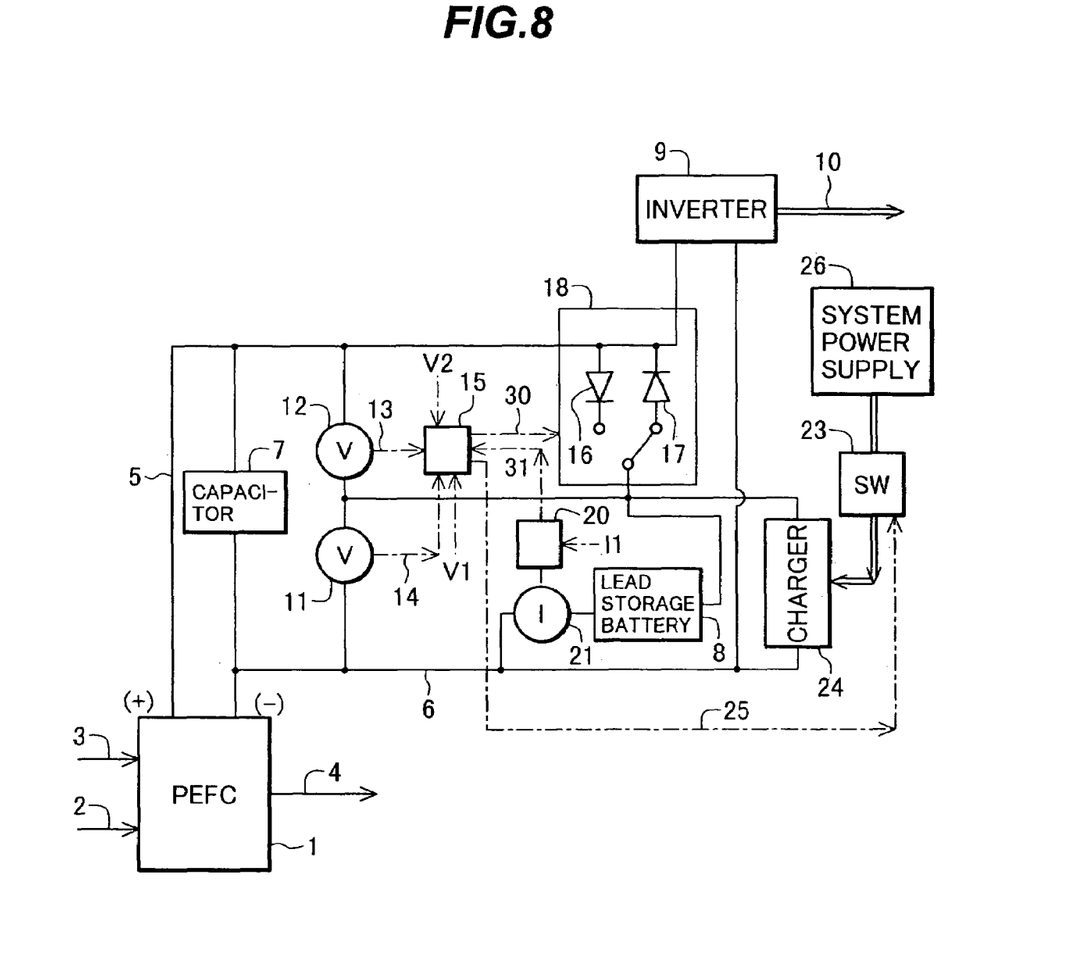
FIG. 8 is a schematic diagram showing the outline of the construction of an entire power supply system using a fuel cell according to a modification in which a grid power supply is used as a power source for the charger.

FIG. 8 is a schematic diagram showing the outline of the construction of an entire power supply system using a fuel cell according to this modification. This modification has nearly the same construction as the modification (D) shown in FIG. 7, but is different from the modification (D) in that the power source for the charger 24 thereof is a grid power supply 26. Specifically, this modification is arranged so that, if the discharge current from the lead storage battery 8 exceeds the specified value Ii, or the voltage becomes a set value or less, the discharge is interrupted by the changeover device 18, as well as the switch 23 is energized, whereby a charge is performed from the grid power supply 26 to the charger 24.

According to this modification, since the grid power supply 26 is connected to the charger 26, the system can be started up even from the point in time when the PEFC is not yet started up, and thereby a higher-reliability power supply system using a fuel cell can be provided.

(F) Case Where Natural Force Power Supply is Used

Figure 9:
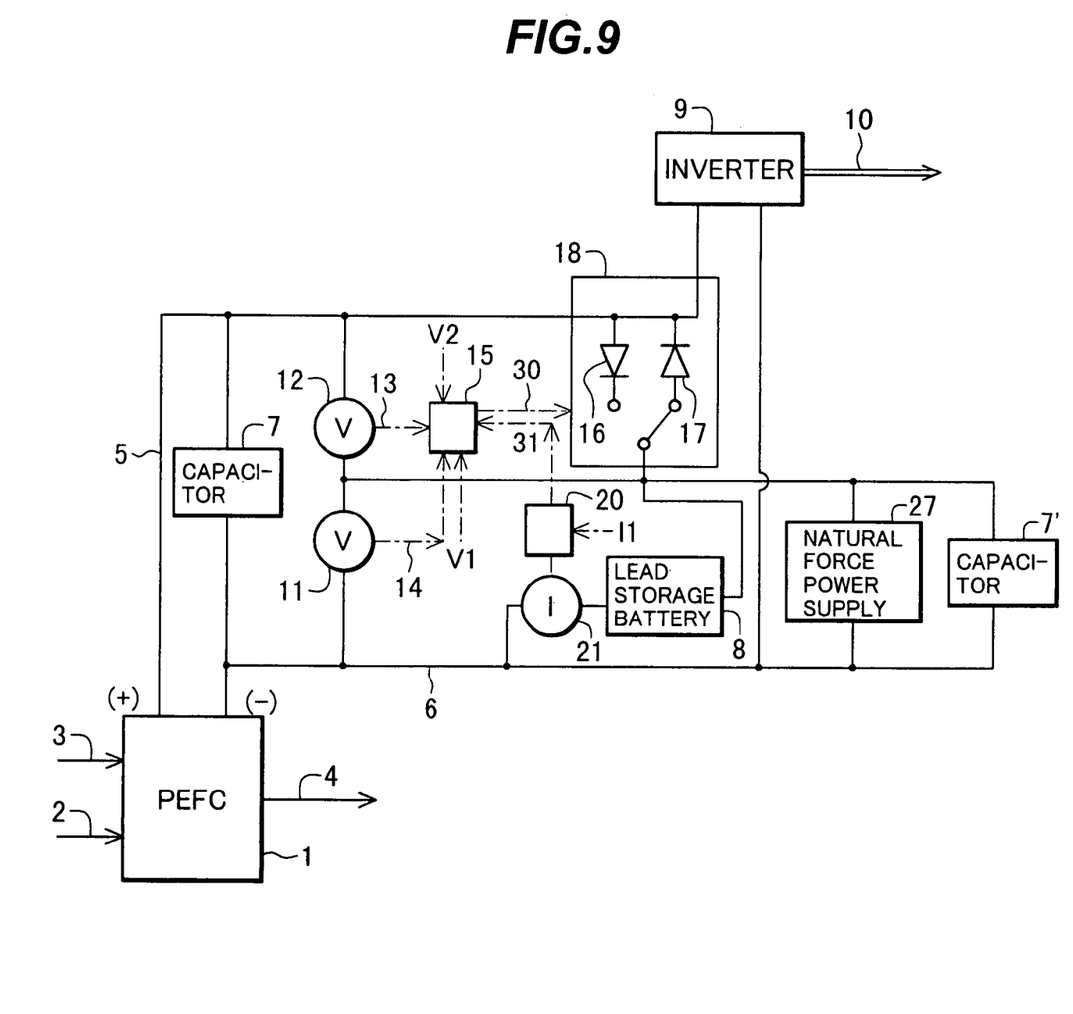
FIG. 9 is a schematic diagram showing the outline of the construction of an entire power supply system using a fuel cell according to a modification using a natural force power supply.

FIG. 9 is a schematic diagram showing the outline of the construction of an entire power supply system using a fuel cell according to this modification. This modification is arranged so that, in the construction of the above-described modification (D) shown in FIG. 7, there are provided a natural force power supply 27 based on photovoltaic power generation or wind power generation, and an electric double layer capacitor 7' connected in parallel with the natural force power supply 27, instead of the charger 24, switch 23, and circuit 22.

Since this modification uses, as an auxiliary power supply of the system, a power supply system that does not issue emissions such as carbon dioxide and the like, it is possible to provide a fuel-cell power supply system that is more environmentally sound and high in reliability.

INDUSTRIAL APPLICABILITY

According to the present invention, it is possible to provided a home-use fuel cell system that allows energy efficiency and cost efficiency to be improved even when applied to power for home-use.

What is claimed is:

1. A home-use fuel cell system for supplying power for power demands of a home, the home-use fuel cell system comprising:
   a fuel cell for supplying a base power portion as an output thereof; and
   a power storage device having a capacitor and a secondary battery, said capacitor and said secondary battery each being electrically connected to said fuel cell to receive and be charged by a charging power portion of said fuel cell output equivalent to the difference between the base power portion and an actual current power demand of said home-use fuel cell system, when said actual current power demand is less than said base power portion;
   wherein said capacitor and said secondary battery of said power storage device are connected to discharge a charge therein corresponding to a peak power portion of said actual current power demand equivalent to the difference between the base power portion and the actual current power demand of said home-use fuel cell system, when said actual current power demand is greater than said base power portion;
   wherein, when the output of the fuel cell is represented by P [W], the capacity of the power storage device is represented by Q [Wh], and the discharge depth of the power storage device is represented by x [%], the following relationships are satisfied:

$250 \leq P \leq 1000$; and $1000/x \times 10 \leq Q \leq 2600/x \times 10$.

2. The home-use fuel cell system according to claim 1, wherein the following relationships are satisfied:

$(0.0085P^2 - 7.2P + 4600)/x \times 10 \leq Q \leq (0.0085 \times P^2 - 7.2P + 7080)/x \times 10$.

3. The home-use fuel cell system according to claim 1, further comprising a protection mechanism for protecting the secondary battery so that the discharge depth thereof does not exceed a predetermined value;
   wherein the protection mechanism comprises interrupting means for interrupting a charging operation or a discharging operation of the secondary battery in accordance with a voltage of the secondary battery.

4. The home-use fuel cell system according to claim 1, further comprising a natural force power-generating mechanism as an auxiliary power supply.

* * * * *